Sept. 9, 1941. P. S. WARRINER 2,255,719
APPARATUS FOR THE CONTINUOUS AUTOMATIC PROJECTION OF
PHOTOGRAPHIC TRANSPARENCIES AND THE LIKE
Filed June 3, 1940 2 Sheets-Sheet 1

Inventor:-
Percy S. Warriner,
By:- Smith, Michael & Gardner,
Attorneys.

Sept. 9, 1941.  P. S. WARRINER  2,255,719
APPARATUS FOR THE CONTINUOUS AUTOMATIC PROJECTION OF
PHOTOGRAPHIC TRANSPARENCIES AND THE LIKE
Filed June 3, 1940  2 Sheets-Sheet 2
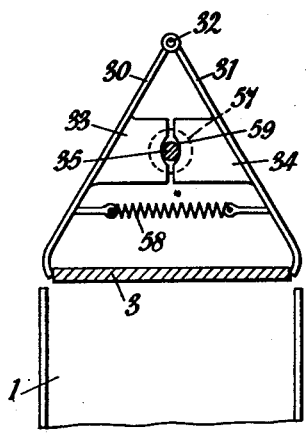
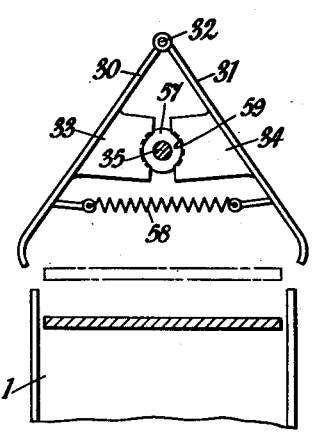
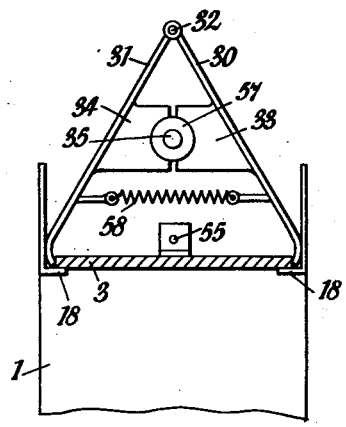
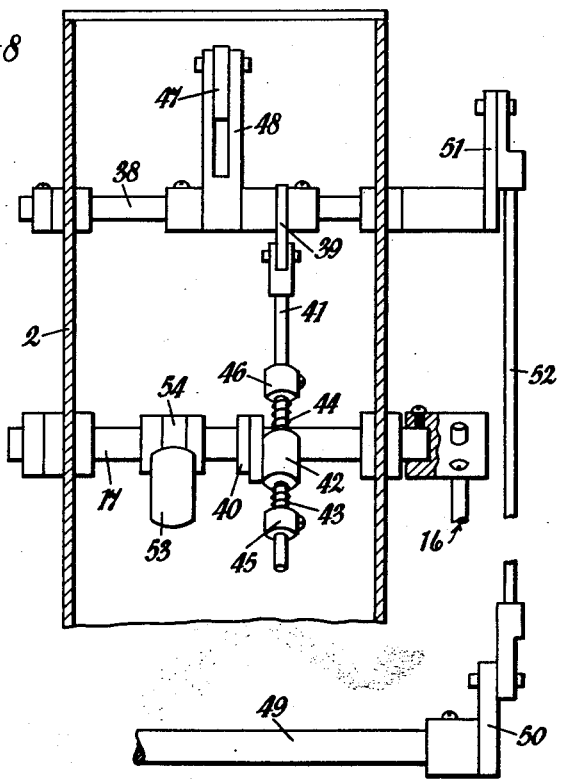

Patented Sept. 9, 1941

2,255,719

UNITED STATES PATENT OFFICE 2,255,719

APPARATUS FOR THE CONTINUOUS AUTOMATIC PROJECTION OF PHOTOGRAPHIC TRANSPARENCIES AND THE LIKE

Percy Stuart Warriner, Doncaster, England

Application June 3, 1940, Serial No. 338,638
In Great Britain June 7, 1939

7 Claims. (Cl. 88—28)

This invention is for improvements in or relating to apparatus for the continuous automatic projection of photographic transparencies and the like, all hereinafter referred to, for brevity, as "slides."

It has for its object to provide an improved form of apparatus for this purpose, which will be characterised by a high order of efficiency coupled with great simplicity of construction and manner of operation.

According to the invention, such an apparatus is provided which comprises a vertical slide magazine in which the slides are accommodated in a pile with the plane of the slides horizontal, means for ejecting the lowermost slide of the pile from the magazine by a movement in its own plane to a position in which it is over an aperture through which a beam of light is projected in a vertical direction, a slide carrier reciprocatable from a lowered position in which it can receive a slide pushed on to it by a movement in its own plane from said position over said aperture, to a raised position in which it registers with a slide reception platform on to which a slide in position on the carrier can be pushed therefrom by a movement in its own plane, jaw means positioned vertically over the magazine for the temporary reception of a slide pushed into it by a movement in its own plane from the reception platform, said jaw means being automatically operable so as first to close, for the reception of the slide, and then to open, for the release of the slide, which thereupon drops back into the magazine, means for reciprocating the carrier, means for pushing the slide off the carrier on to the reception platform and means for operating the jaw means, the arrangement being such that the slide is pushed from said position in which it is over said aperture on to the carrier by the next slide to be pushed into said position from the magazine and similarly the slide is pushed from the reception platform into the jaw means by the next slide to be pushed on to the reception platform from the carrier as that slide is pushed therefrom, and all of the moving parts of the apparatus operate in timed sequence with one another.

As will be appreciated, an apparatus of this description is capable of operating continuously, the slides in the magazine being ejected therefrom and "shown" (that is to say, the picture or other matter on them being projected on to the screen with which the apparatus is being employed) in succession and then replaced in the magazine in the same succession and this going on continuously so long as the apparatus is maintained in operation.

It will further be appreciated that not only is an apparatus of the above description capable of operating in a continuous manner and with the order in which the slides are shown preserved throughout the period of operation of the apparatus, however many times the slides, regarded individually, are shown, but with it the attitude of the slide throughout its path of movement from the magazine to the position over the projection aperture, thence on to the carrier, thence on to the reception platform, thence into the jaw means and finally down into the magazine again, is preserved in the sense that the face that was uppermost when the slide was in the magazine remains uppermost throughout the path of movement of the slide until it is replaced again in the magazine and also there is no change in the position of the slide in its own plane or, in other words, there is no reversal of the slide as regards "left" and "right." This, as will be understood, is an important feature as it makes for simplicity of construction and minimisation of the number of necessary working parts in the apparatus, that is to say, in order to ensure that the slides shall be replaced in the magazine in the repetition feed of the slides therefrom and back thereto in the same attitude.

A further advantage of an apparatus of the above description is that the slides are returned to the magazine at regular intervals irrespective of the number of slides originally placed in the magazine. Thus, the magazine can be either full of slides or only partially filled therewith and in either case, the slides will be shown and then replaced back into the magazine at regular intervals continuously so long as the apparatus is kept in operation. This again is an important advantage as the number of slides comprising a set thereof to be shown in the apparatus may, in some cases, be a relatively small number and in others a relatively large number, as, for instance, in the case of a projection apparatus for advertising purposes, for example such an apparatus for use in a shop window or at an exhibition. In this connection it may be remarked that the improvement according to the present invention is applicable more especially to projection apparatus for advertising purposes, although it is to be understood that it is not limited thereto but is broadly applicable in this respect to apparatus for the projection of photographic transparencies and the like generally.

The invention will now be further described with reference to the accompanying drawings which illustrate one preferred embodiment of the invention by way of example as to how the invention may be carried into effect.

In these drawings:

Figure 5 is a fragmentary transverse section through the jaw means of the apparatus on the section line 5—5 of Figure 1;

Figure 6 is a similar section but showing the jaws of the jaw means in their open position and a slide in the course of its falling back into the magazine below;

Figure 7 is a fragmentary transverse section through the reception platform of the apparatus on the section line 7—7 of Figure 1, and Figure 8 is a fragmentary rear end view of the apparatus looking in the direction of the arrow 7 in Figure 1.

Like reference numerals indicate like parts in the various figures.

Figure 1:
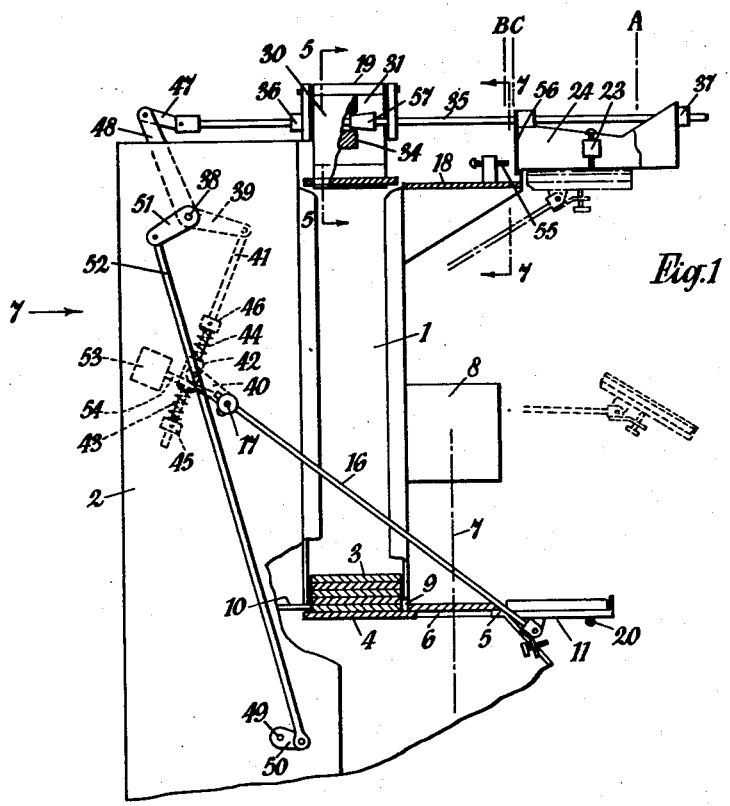
Figure 1 is a side elevation of a portion of a projection apparatus in accordance with the above embodiment of the invention, the part of the apparatus shown being the part which concerns the slide magazine and the repetition slide feeding and returning mechanism associated therewith.

The apparatus shown in the drawings comprises a slide magazine 1. This magazine is incorporated with the general casing or framework of the apparatus, which is marked 2 and, as shown, it occupies a vertical position in the apparatus. The magazine 1 is arranged to contain a pile of slides 3 disposed one upon the other, with the plane of the slide horizontal. The pile of slides 3 rests on a plate 4 forming the floor of the magazine.

Level with the plate 4 is a plate 5 having in it an aperture 6 up through the centre of which, along a line 7, is projected a beam of light from a light source incorporated in the apparatus but not shown in the drawings. This light source co-operates with an optical system for the projection of the beam of light first upwardly through the aperture 6 and then horizontally out of the apparatus towards the screen with which the apparatus is used, the deflection of the light beam into the horizontal direction from the vertical direction along the line 7 being accomplished by means of a reversing prism 8.

The plate 4 and the apertured plate 5 are both truly horizontal and the arrangement is such that the lowermost slide of the pile in the magazine is ejected by a movement in its own plane through a slot 9 at the bottom of the right hand (in Figure 1) wall of the magazine on to the plate 5 in which it is then in projection position over the aperture 6. The means for ejecting the slide may take any desired form. Conveniently, it may take the form described in the specification of my concurrent application for United States Letters Patent No. 350,968, filed August 3, 1940. In itself it forms no part of the present invention. Consequently it is shown quite diagrammatically in the drawings accompanying the present specification, by a part marked 10 in Figure 1, this part 10 being arranged to be reciprocated to and fro in the horizontal direction through a stroke of reciprocation sufficient to push the lowermost slide in the magazine completely out of the magazine through the slot 9 so that it is placed in proper projection position over the aperture 6 in the manner described above.

To the right (in Figure 1) of the apertured plate 5 is, when it is in its lowered position, a slide carrier generally marked 11 in Figure 1. The form and construction of this carrier are more clearly shown in Figures 2, 3 and 4. The arrangement is such that when the carrier is in said lowered position, it registers with the slide in position on the apertured plate 5 so that as the next slide to be removed from the magazine is pushed out therefrom through the slot 9, the previously removed slide now in position on the apertured plate 5, is pushed off therefrom on to the carrier 11, the two movements of the slide first from the magazine on to the apertured plate and then from the apertured plate on to the carrier, being both in the plane of the slide, which, as above indicated, is horizontal, and as will be understood the slide in position on the apertured plate is transferred therefrom to the carrier by the thrust of the ejecting means 10 operating through the intermediary of the lowermost slide in the magazine.

Figure 2:
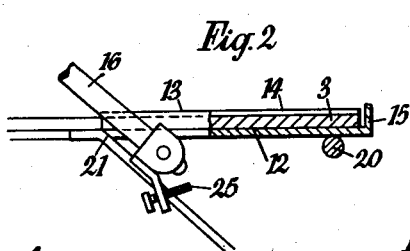
Figure 2 is a fragmentary view on a larger scale than Figure 1, showing the slide carrier in its lowered position.
Figure 3:
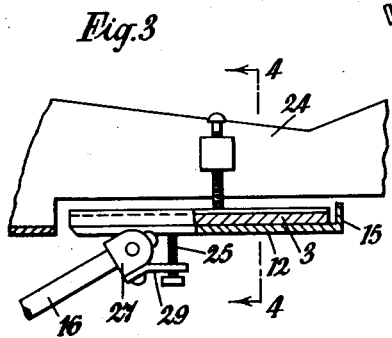
Figure 3 is a similar view showing the slide carrier in its raised position, said Figure 3 and also Figure 2 being side elevational views.
Figure 4:
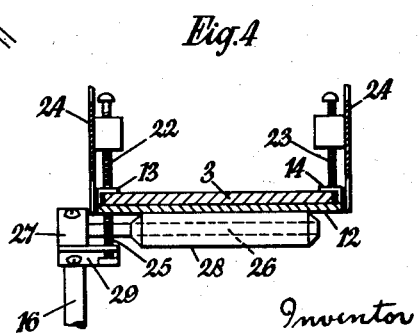
Figure 4 is a cross-section through the slide carrier on the section line 4—4 of Figure 3.

As will be seen from said Figures 2, 3 and 4, the carrier 11 comprises a flat base portion 12, the upper face of which, when the carrier is in its lowered position, is flush with the upper face of the apertured plate 5. Extending along the sides of the base portion 12 are angle-section guide members 13, 14. The distance between the horizontal flanges of the guide members 13, 14 and the upper face of the base portion 12 is such that a slide in position on the carrier is accommodated with an easy sliding fit thereon beneath the said horizontal flanges. At the outer (right hand in Figure 1) end of the base portion 12 is an upstanding stop flange 15 extending partially across the width of the base portion, being formed with a gap at the centre to accommodate a catch hereinafter described.

The carrier is pivotally mounted on the outer end of a long arm 16, the inner end of which is fast on a horizontally disposed shaft 17. The shaft 17 is arranged to oscillate in time with the reciprocations of the ejection device 10 and in its upward movement it raises the carrier 11 from the lowered position in which it appears in full lines in Figure 1 to a raised position in which it appears in chain line in said Figure 1. In the raised position, the carrier registers with a horizontally disposed plate 18 constituting the reception platform hereinbefore referred to of the apparatus, which plate 18 is positioned, as shown, at the level of the top of the magazine 1.

The arrangement is such that when the carrier is in its raised (chain line) position, it is truly horizontal and the upper face of the base portion 12 of the carrier is flush with the upper surface of the reception platform 18 so that a slide in position on the carrier can be pushed off therefrom by a movement in its own plane to the left (in Figure 1) on to the platform in readiness to be pushed off therefrom by the next slide to be pushed on to the platform from the carrier, into a position between the jaws of a jaw device generally marked 19 in Figure 1.

The horizontal alignment of the carrier with the apertured plate 5, that is, when the carrier is in its lowered position is ensured by the provision of a stop 20 and a co-operative stop surface 21 (see Figure 2) adjacent the right hand (in Figure 1) end of the apertured plate 5, the arrangement being such that when the carrier is in the lowered position it abuts firmly the stop 20 at one end and the stop surface 21 at the other end. The horizontal alignment of the carrier with the reception platform 18, that is, when the carrier is in its raised position, is ensured by the provision of a pair of adjustable stops 22, 23 on a portion 24 of the framework of the apparatus and another adjustable stop 25 on the free end of the arm 16, the arrangement being such that by an upward thrust transmitted to the carrier from the arm through the pivotal connection of the latter to the base portion of the carrier, the carrier is pressed against the stops 22, 23 against the reaction of the stop 25 which, as shown, bears upon the underside of the base portion 12 of the carrier while the stops 22, 23 bear upon the upper side of the guide members 13, 14. The said pivotal connection between the free end of the arm 16 and the carrier comprises a pivot pin 26 projecting horizontally from a boss 27 on the extremity of the arm and a fulcrum boss 28 projecting downwardly from the underside of the base portion 12, the adjustable stop 25 taking the form, as shown, of a screw threaded through a lug 29 affixed to the boss 27.

The jaw device 19 consists of a pair of jaws 30, 31 pivotally connected together at the upper end at 32. These jaws carry on the inner side a pair of fingers 33, 34 which are disposed opposite to one another, as shown in Figures 5 and 6 and one on either side of a horizontally disposed rod 35. The rod 35 which is shown also in Figure 1, is mounted in bearings 36, 37 and is reciprocatable therein with the reciprocations of a second horizontally disposed shaft 38 operatively connected to the shaft 17 through the intermediary of a crank 39 fast with the shaft 38, a second crank 40 fast with the shaft 17 and a connecting rod 41 which slidably extends through a block 42 pivotally connected to the crank 40 at the free end thereof. The thrust from the connecting rod 41 to the crank 40 is transmitted through the intermediary of compression springs 43, 44 interposed between the block 42 and adjustable abutments 45, 46 on the connecting rod.

The connection between the rod 35 and the shaft 38 comprises a link 47 and a crank 48, the crank being fast with the shaft 38.

The shaft 38 is operatively connected to a third horizontal shaft 49 through a crank 50 fast therewith, a crank 51 fast with the shaft 38 and a connecting rod 52. The shaft 49 is driven continuously, for example by a motor (not shown) incorporated in the apparatus, and as it rotates, the crank 50 being shorter than the crank 51, it oscillates the shaft 38 and with it the crank 48, which in turn reciprocates the rod 35.

The slide carrier 11 and the arm 16 are counterbalanced by a weight 53 on the free end of an arm 54 fast with the shaft 17.

On the part 24 of the framework of the apparatus is an adjustable stop 55, the operative end of which is positioned in the path of a flexible catch 56 on the rod 35.

On the rod 35 is a cone 57, the position of which along the rod is such that just prior to the end of the stroke to the left (in Figure 1) of the rod 35 the cone enters the space between the finger members 33, 34 and by reason of its conical form forces these members and with them the jaws 30, 31 apart sufficiently to release the slide in position in the jaws. Up to this point in the leftward movement of the rod the slide has been held in the jaws by and between the free ends thereof, the said free ends being slightly curved inwardly, so as to provide a support for the slide, as shown in Figures 5 and 6. The jaws are forced apart against the pull of a tension spring 58 anchored at its ends to the jaws, and the finger members 33, 34 are conically recessed at 59 to conform to the conical form of the cone 57.

During the movement of the carrier 11 from the lowered position to the raised position and vice versa, the carrier, as shown in dotted lines in Figure 1, occupies an inclined position, being supported in this position by the stop 25, with the result that the slide in position on the carrier during the upward stroke thereof, is prevented from falling out of the carrier through the open (left hand in Figure 1) end thereof.

The slide is pushed off the carrier on to the platform 18 by the flexible catch 56.

In the movement to the left (in Figure 1) of the rod 35, the catch 56, having pushed the slide from the carrier on to the platform 18, commences to abut the stop 55, which operates to arrest any further movement of the catch, the rod 35 continuing on, however, to the end of its stroke with consequent flexing of the catch. The initial (outer) position of the rod is marked A, the final position B and the position at which the catch 56 commences to abut the stop 55, C.

Upon the rod reaching the position B, the carrier commences to descend to the lowered position and the rod returns to the initial position A.

Upon the carrier reaching the lowered position the ejecting device 10 operates, in the manner above described, to push another slide on to it, which is thereupon raised by the carrier and eventually transferred therefrom to the platform 18 so as to displace the slide previously deposited thereon in to the jaws 30, 31.

The resilient form of connection which is provided by the springs 43, 44 between the rod 41 and the crank 40 is for the purpose of ensuring that the carrier shall remain stationary and in true horizontal alignment with the apertured plate 5, or the platform 18, during the loading of a slide on to the carrier or, as the case may be, the removal of a slide on to the platform 18. The operative strength of the springs 43, 44 is so adjusted, by appropriate adjustment of the stops 45, 46 along the rod 41, that the springs are not compressed until the carrier comes into abutment with the parts 20, 21 (or stops 22, 24) in the movement of the arm 16, the rod continuing to move against the spring 43 (or 44) through a short final portion of its stroke.

In order to facilitate the movement of the slide into the space between the jaws 30, 31, the right hand (in Figure 1) end of the jaws is or may be slightly curved outwardly at the level of the path of the slide into the jaws.

The slide is placed fully into position in the jaws, so as to be poised thereby centrally over the magazine 1 in readiness to be released in the manner described above when the rod 35 has reached the position C.

The carrier 11 performs a complete oscillation once per revolution of the shaft 49 and in order of sequence the operations performed are:

(1) The lowermost slide in the magazine is ejected therefrom into position over the aperture 6, the slide in position thereover is pushed on to the carrier and the rod 35 commences to return to the position A.

(2) The arm 16 swings upwardly, carrying with it the carrier 11, the rod 35 continuing its return movement to the position A.

(3) The rod 35 commences to move from A to B and as it does so the catch 56 pushes the slide on the carrier on to the platform 18, the slide already thereon being pushed off in to the jaws 30, 31 in the operation.

(4) The cone 57, on the rod 35 reaching the position C, commences to open the jaws 30, 31, effecting their full opening as the rod reaches the final position B, and at the same time the carrier returns to the lowered position. This completes the cycle.

It will be understood that the invention is not limited to the particular constructional details described above with reference to the drawings, but is of broad scope in this respect so as to include any obvious equivalents thereof.

What I claim as my invention and desire to secure by Letters Patent of the United States is:

1. An apparatus for the continuous automatic projection of "slides" as herein referred to, comprising in combination a vertical slide magazine in which the slides are accommodated in a pile with the plane of the slides horizontal, means for ejecting the lowermost slide of the pile from the magazine by a movement in its own plane to a position in which it is over an aperture through which a beam of light is projected in a vertical direction, a slide carrier reciprocatable from a lowered position in which it can receive a slide pushed on to it by a movement in its own plane from said position over said aperture, to a raised position in which it registers with a slide reception platform on to which a slide in position on the carrier can be pushed therefrom by a movement in its own plane, jaw means positioned vertically over the magazine for the temporary reception of a slide pushed into it by a movement in its own plane from the reception platform, said jaw means being automatically operable so as first to close, for the reception of the slide, and then to open, for the release of the slide, which thereupon drops back into the magazine, means for reciprocating the carrier, means for pushing the slide off the carrier on to the reception platform and means for operating the jaw means, the arrangement being such that the slide is pushed from said position in which it is over said aperture on to the carrier by the next slide to be pushed into said position from the magazine and similarly the slide is pushed from the reception platform into the jaw means by the next slide to be pushed on to the reception platform from the carrier as that slide is pushed therefrom and all of the moving parts of the apparatus operate in timed sequence with one another.

2. An apparatus as specified in claim 1, wherein the carrier is mounted on the free extremity of an arm which oscillates in a vertical plane to move the carrier from the lowered position to the raised position and vice versa.

3. An apparatus as specified in claim 1, wherein the carrier is pivotally mounted on the free extremity of an arm which oscillates in a vertical plane to move the carrier from the lowered position to the raised position and vice versa, the arrangement being such that during at least the upward movement of the carrier, the latter occupies a position on the arm in which it is tilted in a direction to prevent the slide from falling out of the carrier.

4. An apparatus as specified in claim 1, wherein the jaws of the jaw means are opened by a cone inserted between them, against the opposing constraint of spring means operative to close the jaws.

5. An apparatus as specified in claim 1, wherein means are provided for adjusting the position of the carrier relatively to the means which reciprocates it, for the purpose of aligning the carrier in the raised position thereof relatively to the reception platform.

6. An apparatus as specified in claim 1, wherein the carrier is reciprocated by a driving means which includes a continuously reciprocatable member, a member movable with the carrier and a resilient connection between the continuously reciprocatable member and the member movable with the carrier, and the carrier, in the lowered position and similarly in the raised position, abuts stop means in its path which operate to locate the carrier in true register with the slide to be moved on to it from the position over the aperture and similarly in true register with the slide reception platform and in conjunction with the resilient connection, to hold the carrier in said register while the slide is being moved on to and off from it.

7. An apparatus as specified in claim 1, wherein the carrier is reciprocated by a drive from a continuously rotating shaft which drives also the means for pushing the slide off the carrier on to the reception platform, which drive is transmitted to the carrier through a continuously oscillating rock-shaft through which also the drive is transmitted to the said means for pushing the slides off the carrier, a crank on the rock-shaft, a member continuously reciprocated by the crank, a member movable with the carrier and a resilient connection between the continuously reciprocating member and the member movable with the carrier, and the carrier, in the lowered position and similarly in the raised position, abuts stop means in its path which operate to locate the carrier in true register with the slide to be moved on to it from the position over the aperture and similarly in true register with the slide reception platform and in conjunction with the resilient connection, to hold the carrier in said register while the slide is being moved on to and off from it.

PERCY STUART WARRINER.